Dec. 5, 1967  F. ROSEN  3,356,012
GRILL
Filed March 29, 1965  2 Sheets-Sheet 1

INVENTOR.
FRANK ROSEN

Dec. 5, 1967   F. ROSEN   3,356,012
GRILL
Filed March 29, 1965   2 Sheets-Sheet 2

INVENTOR.
FRANK ROSEN
BY

United States Patent Office 3,356,012
Patented Dec. 5, 1967

3,356,012
GRILL
Frank Rosen, Mansfield, Ohio, assignor to Dominion Electric Corporation, a corporation of Ohio
Filed Mar. 29, 1965, Ser. No. 443,504
7 Claims. (Cl. 99—446)

My invention relates to grills, such as used for cooking food.

An object of my invention is the provision of an improved structure for a grill which permits the open cooking of the food with the production of a minimum amount of smoke, fumes and odors.

Another object is the provision for protecting the grease produced by food being cooked from the heat radiated by the source of the heat used in cooking the food.

Another object is the provision of a unique arrangement for trapping the grease which drips down from food being cooked over a grill and to protect or guard the trapped grease from the direct influence of the heat source used in the grill.

Another object is the provision of a unique arrangement for housing the heating element of a grill and for accommodating auxiliary cooking devices associated with the use of the grill.

Another object is the provision of a unique structure making safe and relatively pleasant the use of a grill for cooking in the open without a flue or other exhaust means.

Another object is the provision for minimizing fumes, smoke and odors in the open cooking of food and particularly food which tends to produce grease and the like during the cooking operation.

Other objects and a fuller understanding of the invention may be had by referring to the following description and claims, taken in conjunction with the accompanying drawings, in which:

Figures 1, 2:
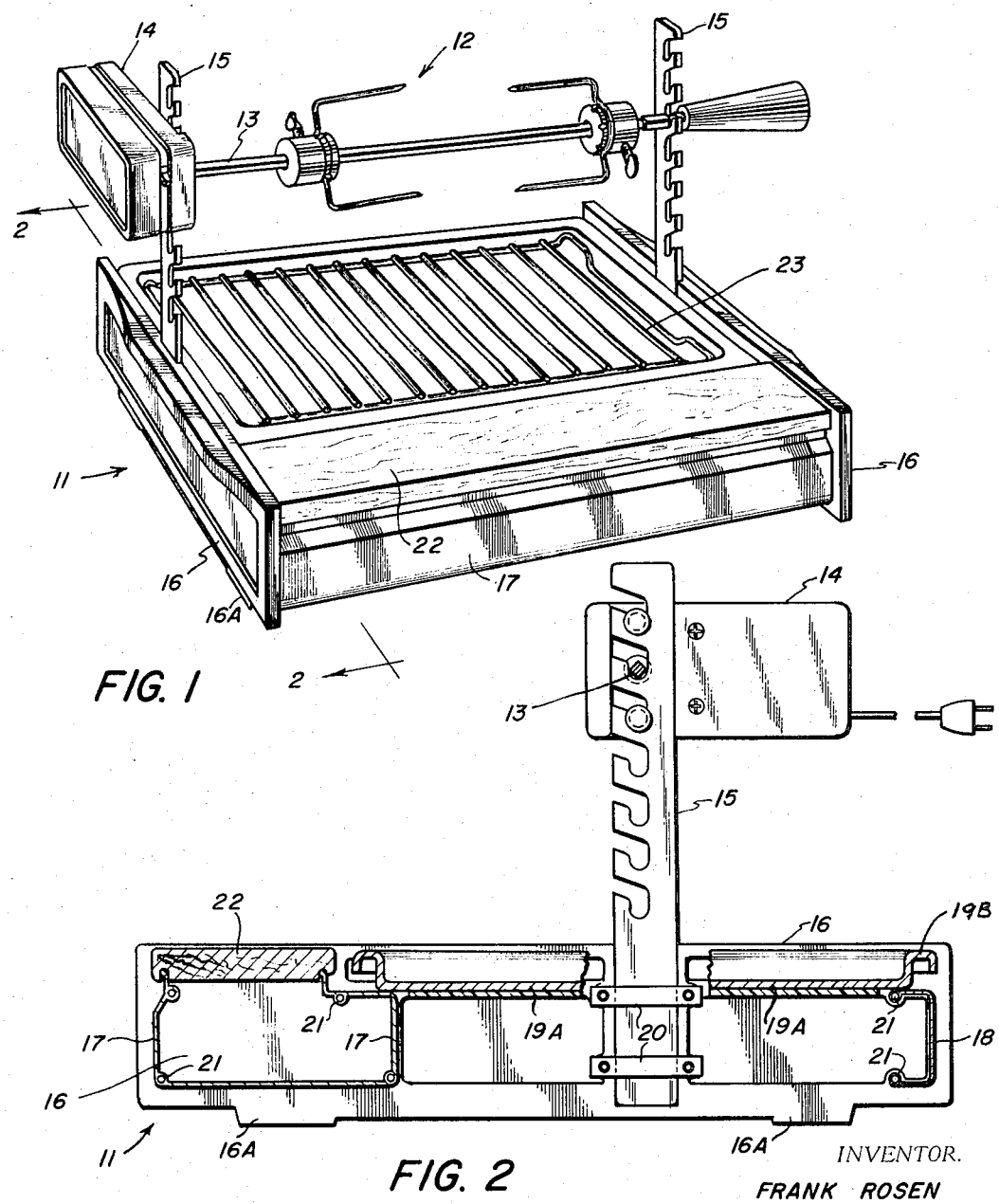
FIGURE 1 is a perspective view of a grill shown by way of example and embodying the preferred form of my invention.
FIGURE 2 is a cross-sectional view of my grill looking in the direction of the arrows 2—2 of FIGURE 1.
Figure 3:
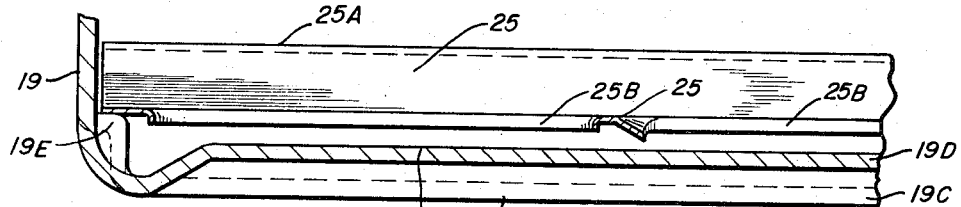
FIGURE 3 is an enlarged sectional view taken through a portion of my grill and looking in the direction of the arrows 3—3 of FIGURE 5.
Figure 4:
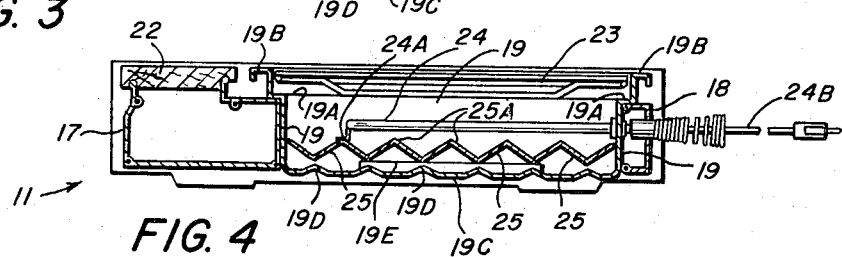
FIGURE 4 is a cross-sectional view of my grill taken through the line 4—4 of FIGURE 5.
Figure 5:
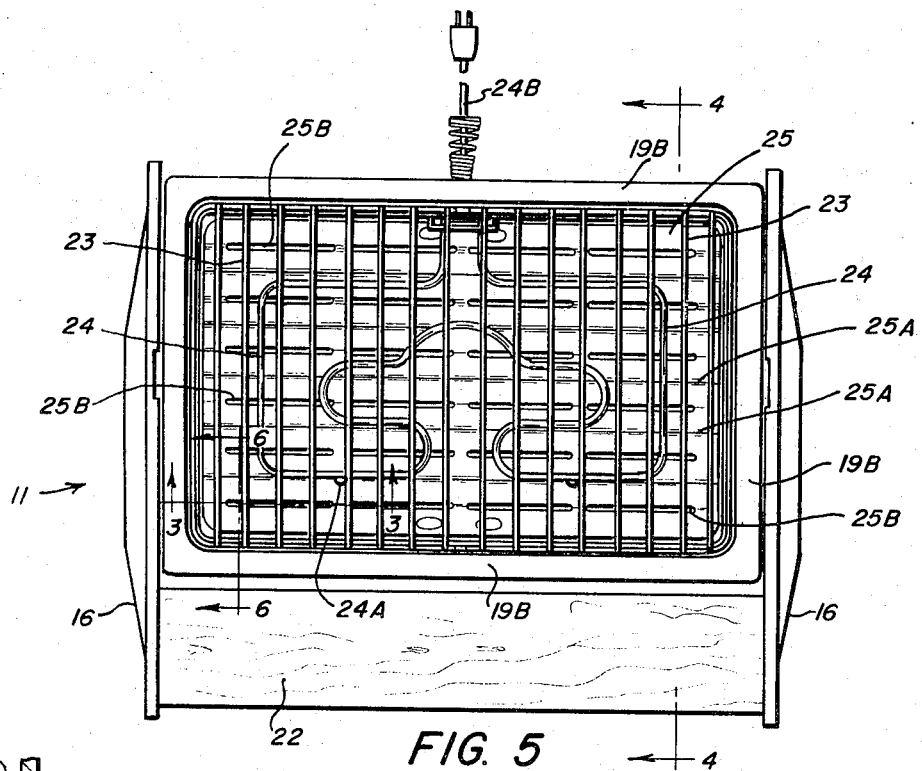
FIGURE 5 is a plan view of my grill, drawn on a smaller scale than that shown in FIGURES 1 and 2, looking down on the top of my grill.
Figure 6:
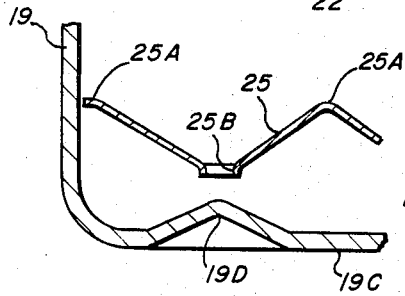
FIGURE 6 is an enlarged sectional view taken through a portion of my grill looking in the direction of the arrows 6—6 of FIGURE 5.

In the drawings, the grill unit is shown generally by the reference character 11. Disposed above the grill unit 11 is a rotisserie or rotary spit 12 adapted to hold meat or the like in position to be cooked from heat generated within the grill unit 11 below. The rotisserie 12 is carried by a rotatable shaft 13 which, in turn, is supported by two upright supports 15 positioned at opposite ends of the grill 11. Slots in the end walls of the unit together with straps 20 permit the vertical supports 15 to be inserted into position when needed and to be withdrawn when not in use. An electric driving unit 14 mounted on one of the supports 15 is adapted to rotate the shaft 13 and hence the rotisserie 12.

The grill 11 has two oppositely disposed end walls 16 preferably formed of a suitable molded plastic material that is heat-insulating in character and which provides strength and rigidity to the grill construction. Projections 16A on the bottom edge of the end walls 16 provide legs for supporting the grill on a table or the like. Disposed between the end walls 16 near the forward side of the grill is a front shell or auxiliary compartment 17. This shell 17 has two parallel opposed walls and a bottom wall making up an open-ended channel the opposite open ends of which are closed by the respective end walls 16. Screw bolts 21 secure the compartment 17 to the end walls 16 so as to hold the parts in assembled condition. At the rear side of the grill there is a metal rear wall 18 made up of a U-shaped member secured to the end walls 16 by screw bolts 21. The rear wall 18 holds the end walls 16 apart and in fixed parallel position.

The compartment 17 is adapted to hold auxiliary cooking devices, such as rotisserie parts, spits, spoons, forks, knives and the like, when not in use. A wooden carving board 22 provides a cover for the auxiliary compartment. As seen in the drawings, the board 22 has spaced parallel grooves which accommodate the upper edges of the metal walls of the compartment 17 and by swinging one edge or the other of the board upwardly, a hinged action is obtained.

Positioned between the end walls 16 and between the compartment 17 and the rear wall 18 is a metal rectangular pan 19 forming a compartment accommodating a heat source and also accommodating grease and the like produced by food being cooked. This pan has a bottom wall 19C and extending upwardly from its peripheral edges are four vertical walls terminating in horizontal raised edge portions 19B extending around the pan 19. Spaced below the raised edge portions 19B is formed a step or ledge portion 19A which supports a horizontally disposed open grid 23 upon which food or the like may be supported during its cooking. The bottom wall 19C has equidistantly spaced longitudinally extending peaks or raised portions 19D. This in effect makes the bottom wall of the pan corrugated or wavy in configuration. Thus there is provided a bottom surface in the pan 19 which has alternately disposed peaks or raised portions and valleys or depressed portions therebetween.

At the opposite ends of the metal pan 19 there are provided ledges 19E disposed horizontally and extending inwardly of the pan 19. A corrugated plate or baffle 25, made of metal and preferably of stainless steel, is supported on the opposite ledges 19E in a horizontal plane above the bottom wall 19C. Preferably the plate or baffle 25 has a shiny or reflective upper surface tending to reflect upwardly heat impinging on the plate 25 from above. This plate 25 is of general corrugated form so as to provide parallel equidistantly spaced peaks or raised portions 25A extending therealong. These peaks 25A provide valleys or depressed portions between and parallel to the peaks 25A. Formed in the baffle or plate 25 at the bottom of the respective valleys or depressed portions are openings or slits 25B providing communications from above the plate 25 to the space below the plate 25. Positioned in the pan 19 above the plate 25 is an electric-resistant heating element 24. This heating element 24 has its terminals connected to an electrical connection 24B which extends rearwardly of the grill and which is adapted to be connected to a source of electrical energy. The two rearward ends of the heating element are supported by a suitable insulation element extending through the pan 19 and the rear wall 18 in the usual manner. A pair of legs 24A carried by the heating element 24 support the forward portion of the heating element 24 upon the plate 25.

It will be noted by referring to the drawing that the valleys of the plate 25 are directly over and in vertical alignment with the peaks 19D of the bottom wall 19C. Also it is to be noted that the peaks or raised portions 25A are disposed over and in vertical alignment with the valleys or depressed portions of the bottom wall 19C. Thus grease or other liquid dripping downwardly from food being cooked, such as meat on the grid 23 or meat on the rotisserie 12, tends to fall down on the plate 25 and by gravity to flow down into the several valleys thereof and down through the slits or openings 25B. From there the grease or other liquid falls downward on the several peaks or raised portions 19D and thence flows downwardly into the valleys or depressed portions of the bottom wall 19C. There the grease or liquid collects in pools in the valleys or depressed portions of the bottom wall 19C which are below the peaks or raised portions of the plate 25. The grease or liquid in such pools are guarded or protected from direct radiation of the heat produced by the heating element 24. The heat from the heating element 24 tends to be reflected upwardly by the shiny surface of the plate 25. Any heat escaping directly downward through the openings or slits 25B would strike only the top of the peaks or raised portions 19D which is above elevation of the pools of grease or liquid collected in the valleys or depressed portions of the bottom wall. By this arrangement, the collected grease or other liquid is so protected from direct radiation of heat that the grease or other liquid is held at a lower temperature than otherwise and it does not tend to ignite or to smoke and cause fumes as it would without such protection. Cooking is accomplished with a minimum of smoke, fumes and odors that usually result from the overheating and occasional burning of the grease or other liquid that is collected from food being cooked, such as grease-producing meat. In addition to increasing comfort and convenience, safety is afforded by minimizing the danger of fire and excessive heat and smoke caused by burning grease.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and scope of the invention as hereinafter claimed.

What is claimed is:

1. A grill construction for the cooking of grease-producing food comprising in combination an open-topped structure having a generally horizontal bottom wall and marginal walls extending upwardly from said bottom wall to define an open space above the bottom wall and within the marginal walls, an electric heating element carried by said structure, and a support carried by the structure above the plane of said heating element to support said food to be cooked by the heat from said heating element, said bottom wall carrying a grease-collecting surface, said grease-collecting surface having a plurality of alternating peaks and valleys extending laterally of the surface, a baffle plate carried by the said structure below said support and heating element and positioned above and generally parallel to said surface in the path of grease dripping downwardly from the food on said support, said baffle plate having a plurality of alternating peaks and valleys extending laterally of the baffle plate, the valleys of said baffle plate being positioned above the peaks of said surface and the peaks of said baffle plate being positioned above the valleys of said surface, said baffle plate having openings therethrough at the locations of the valleys in the baffle plate for permitting grease falling down on the baffle and flowing into the valleys thereof to escape downwardly through the openings onto the peaks of said surface, said surface causing grease falling through the openings onto said peaks of the surface to flow downwardly and settle in the valleys of the surface under the said baffle plate, the said baffle plate above the valleys of said surface protecting the grease settled in the same from direct radiation of heat from the heating element above said baffle plate.

2. A grill construction as claimed in claim 1 and in which said baffle plate is reflective on its upper side to reflect upwardly heat radiated downwardly thereon from said heating element.

3. A grill construction as claimed in claim 1 and in which the peaks of the said grease-collecting surface are generally parallel and equidistantly spaced apart, and the valleys of the said baffle plate are generally parallel and equidistantly spaced apart, the valleys of the baffle plate and the corresponding peaks of the grease-collecting surface being arranged in generally vertical parallel planes, respectively.

4. A device for cooking a grease-producing comprising support means for supporting said food, electric heating means below said support means for providing heat to cook said food, baffle means below said heating means for receiving grease dripping downwardly from said food during cooking, grease-collecting means below said baffle means for receiving grease from said baffle means, said baffle means including a plurality of laterally-spaced first sump means into which said grease received by the baffle means may flow, said grease-collecting means having a plurality of laterally-spaced second sump means into which said grease received by the grease-collecting means may flow, said first and second sump means each being separated by contiguous raised surface means to cause grease to flow into adjacent of the sump means, respectively, of the baffle means and grease-collecting means, each of said first sump means including drain means to permit grease flowing into the first sump means to flow through the baffle means down to the said grease-collecing means, the first and second sump means of the respective baffle means and grease-collecting means being displaced from vertical alignment so that grease flowing into the first sump means and down through the drain means flows onto the raised surface means of the said grease-collecting means and thence flows into the second sump means positioned below raised surface means of said baffle means.

5. A grill construction comprising in combination, a support adapted to support food which produces grease that drips downwardly therefrom during the cooking of the food, a first corrugated plate member having alternately arranged parallel peaks and valleys extending laterally thereof, a second corrugated plate member having alternately arranged parallel peaks and valleys extending laterally thereof, said plate members being disposed in generally horizontal planes below said support and the second plate member being disposed above the first plate member, the peaks of the second plate member being disposed above and generally parallel with the valleys of the first plate member, the valleys of the second plate member being disposed above and generally parallel with the peaks of the second plate member, said second plate member having openings therethrough at the location of said valleys in the second plate member to provide that grease dripping downwardly from food on said support onto said second plate member and flowing into the valleys of the second plate member drains downwardly through said openings onto the peaks of the first plate member and thence flows into the valleys of the first plate member and is there covered from above by the peaks of said second plate member, and an electric heating element positioned below said support and above said second plate member for cooking said food, said second plate member having a reflective upper surface for reflecting upwardly heat from said heating element, said second plate member being directly over said first plate member except at the locations of said openings above the peaks of the first plate member to shield from the heat radiated downwardly by the heating element grease on said first plate member.

6. A grill construction comprising in combination, a support adapted to support food which produces grease that drips downwardly therefrom during the cooking of the food, a first corrugated plate member having alternately arranged parallel peaks and valleys extending laterally thereof, a second corrugated plate member having alternately arranged parallel peaks and valleys extending laterally thereof, said plate members being disposed in generally horizontal planes below said support and the second plate member being disposed above the first plate member, the peaks of the second plate member being disposed above and generally parallel with the valleys of the first plate member, the valleys of the second plate member being disposed above and generally parallel with the peaks of the second plate member, said second plate member having openings therethrough at the location of said valley in the second plate member to provide that grease dripping downwardly from food on said support onto said second plate member and flowing into the valleys of the second plate member drains downwardly through said openings onto the peaks of the first plate member and thence flows into the valleys of the first plate member and is there covered from above by the peaks of said second plate member, and a box-like structure having a bottom wall and side walls extending upwardly therefrom and enclosing said heating element and plate members between said side walls, and the bottom wall thereof forming said first plate member.

7. A grill device comprising in combination an open-topped compartment, said compartment having a generally horizontal bottom wall and side walls extending upwardly therefrom, said bottom wall carrying a grease-collecting surface having a plurality of raised portions and depressed portions alternately recurring laterally across said surface, a generally horizontal baffle plate positioned in said compartment above said surface and generally parallel thereto, said baffle plate having a plurality of raised portions and depressed portions alternately recurring laterally across said baffle plate, said baffle plate being arranged in said structure to locate the depressed portions thereof vertically above the raised portions of said surface, said baffle plate being adapted to receive grease dripping downwardly in the structure from grease-producing food being cooked above said baffle plate and to allow the received grease to flow into the depressed portions of said baffle plate, said baffle plate being vented at locations in said depressed portions to permit grease flowing into said depressed portions of the baffle plate to escape downwardly onto the raised portions of said surface therebelow, the said surface causing grease flowing onto the raised portions thereof to flow downwardly into the depressed portions of the surface where it is covered above by said baffle plate, and an electric heating element carried by said compartment above said baffle plate for providing heat for the cooking of said food, and a support carried by said compartment above said heating element for supporting said food in cooking proximity to said heating element.

References Cited

UNITED STATES PATENTS

| | | | |
|---|---|---|---|
| 806,475 | 12/1905 | Koneman | 99—446 |
| 1,266,912 | 5/1918 | Bradbury. | |
| 1,504,102 | 8/1924 | Davis | 99—445 |
| 2,577,963 | 12/1951 | Hagopian | 126—14 X |
| 2,951,435 | 9/1960 | Fry | 99—446 X |
| 2,903,549 | 9/1959 | Joseph | 126—25 X |
| 2,905,077 | 9/1959 | Del Francia | 99—446 |
| 2,951,435 | 9/1960 | Fry | 99—446 X |
| 2,983,269 | 5/1961 | Montesano | 126—25 |
| 3,027,887 | 4/1962 | Krohncke | 126—25 |
| 3,166,006 | 1/1965 | Lennox | 99—446 |

WALTER A. SCHEEL, *Primary Examiner.*

J. NEARY, *Assistant Examiner.*